Feb. 7, 1956  J. W. MURRY  2,733,811

HEAVY SOLID MIXTURE CLASSIFICATION

Filed Feb. 10, 1953  4 Sheets-Sheet 1

INVENTOR.
JAMES W. MURRY
BY
Christy, Parmelee and Strickland
his ATTORNEYS.

Feb. 7, 1956   J. W. MURRY   2,733,811
HEAVY SOLID MIXTURE CLASSIFICATION
Filed Feb. 10, 1953   4 Sheets-Sheet 2

INVENTOR.
JAMES W. MURRY.
BY
Christy, Parmelee and Strickland
his ATTORNEYS

INVENTOR.
JAMES W. MURRY

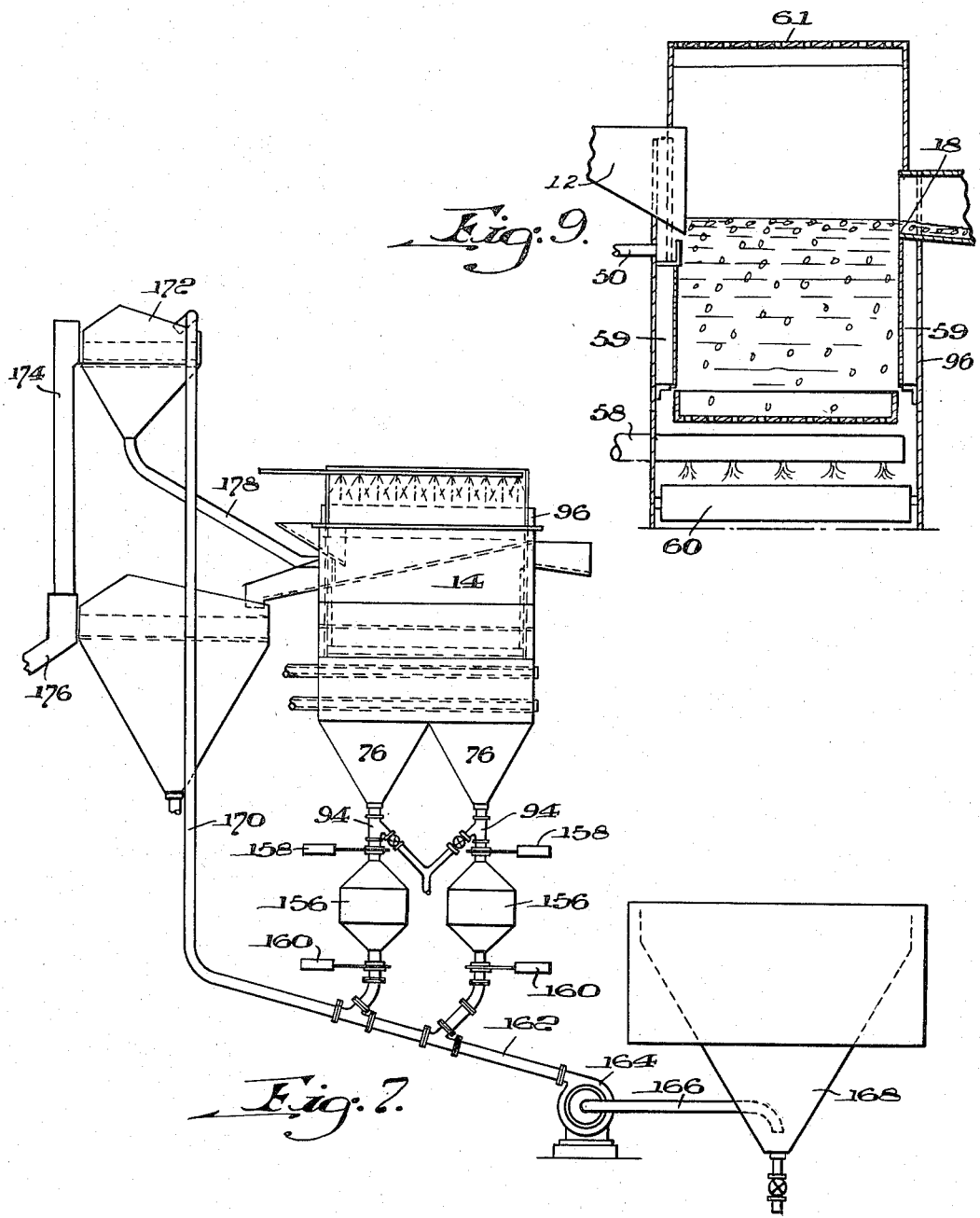

United States Patent Office 2,733,811
Patented Feb. 7, 1956

2,733,811

HEAVY SOLID MIXTURE CLASSIFICATION

James W. Murry, Fairmont, W. Va.

Application February 10, 1953, Serial No. 336,134

18 Claims. (Cl. 209—172.5)

This invention relates to the classification of heavy solid mixtures. More particularly, the invention relates to a method of and apparatus for separating mixtures such as coal, ores and the like into products of different specific gravities, wherein a mixture of water with sand is used as a mass fluid to form a partition for effecting the separation.

The use of a mixture of sand and water to act as a media to float—separate—coal from bone, slate, and other heavy refuse, is known as the "Chance" system and is quite widely used. The "Chance" coal floatation system uses a short cylindrical section superimposed on a cone-shaped separator for floating the coal across the top of a mixed body of sand and water. Sand with water is introduced into the top of the cone and streams of water are introduced around the wall of the cone to control the specific gravity of the sand-water mixture. While the sand is held in suspension by the hydraulic action of the water introduced around the wall of the cone, it is necessary in the "Chance" process to use an agitator. This agitator performs two functions: first, by its rotation it sets up a rotary movement of the sand-water mixture which acts as a conveyor to move the coal, which is fed into the cone, around from feed to discharge point; second, the movement of the agitator also tends to move any sand that may settle out on the sloping wall of the cone bringing this sand back into suspension. This agitator is a source of extra power and heavy maintenance. In the "Chance" process, all refuse settles through the bottom of the cone and is removed by their trapping process. Since this process uses a cone-shaped separator, the cross-sectional area increases from the bottom to the top and a very large volume of water is required to float the sand and coal out of the separator. The "Chance" process rates the capacity of the cone on the number of square feet of the cylindrical section superimposed on the cone. This capacity is usually about 2.5 tons per square foot of top area. As an illustration, a cone 13' 6" diameter has 143 square feet and would be rated at about 350 tons per hour. Since the sand must be held in suspension in 143 square feet, the circulating water required would be in this proportion.

The "heavy media" method of coal floatation separation is quite extensively used which is illustrated and described in the patent of Davis 2,482,747, issued September 27, 1949. For this separation, the heavy media is a mixture of magnetite and water. The mixture is pumped into the separator at the specific gravity required for the separation. The control of the specific gravity of this mixture is outside of the washer. The magnetite is ground very fine (usually 100% minus 100 mesh 65–75% of the product will pass through a 325 mesh screen). The rate of settling of the fine particles of magnetite is very slow so that there is very little settling of the magnetite in the Davis separator. Since the settling rate of magnetite is very low, only a very small percentage of the media is pumped into the lower part of the separator to prevent this settling. The specific gravity of the media is substantially uniform throughout the separator. The heavy media substantially retains its specific gravity when it is removed from the separator with the clean coal and refuse. The major portion of the heavy media is continuously recycled from the overflow of the separator back into the upper portion of the separator to provide the coal floatation media. While most of the heavy media is recycled back to the washer some magnetite adheres to the float coal and refuse and is washed off for recovery by clear water sprays. This mixture of clear water and magnetite is not of proper specific gravity to immediately return to the washer.

In all processes for washing granular coal, some fines are always found in the media. This may be due to poor screening or degradation of the coal in the conveying equipment or in the washer itself. For this reason, a system must have a method to remove these fines. To separate the fines in the heavy media systems, the media is so fine that its settling rate is about the same as the fine coal. Therefore, the magnetite in the media with the fines is magnetized causing the magnetite to agglomerate into pellets which have a high settling rate. The pellets settle and leave the coal fines in the water and from this point the fines or slurry are removed. In my system, sand of relatively coarse size is used in the media. This makes it possible to settle the sand in the sand sump leaving the fines to overflow into an outer compartment of the sand sump from which point the fines are removed.

I have found that if the specific gravity of a sand-water float media is properly controlled, a very efficient separation of clean coal may be carried out while washing coal with a high rate of throughput. The quartzite sand should not contain particles coarser than will pass through a 40 mesh screen or finer than will pass through an 80 mesh screen. I also find that it is necessary to maintain a comparatively deep bed of the sand-water float media and to have a substantially uniform specific gravity throughout the body. This requires a separating compartment which has a uniform cross-sectional area throughout the entire height of the body of float media. Further, the body of the separating media should not be stirred or agitated by stirrers or conveyors.

The primary object of the present invention is to provide an apparatus to maintain a deep body of sand-water floatation media in which the desired specific gravity of the media is uniform throughout the body.

A further object of the invention is to provide an apparatus by which the coarse and fine refuse separated from the coal may be separately removed from the separator.

Another object of the present invention is to provide an apparatus for classifying heavy solid mixtures by which the heavy sink refuse passing down through a sand-water float media may be continuously disposed of without disturbing the specific gravity of the media.

A still further object of the invention is to provide an apparatus for controlling the density of the fluid mass for the efficient disposal of the fine refuse after it has been separated from coal.

With these and other objects in view, the invention consists in the heavy solid mixture classification apparatus as hereinafter described and defined in the appended claims.

The various features of the invention are illustrated in the accompanying drawings, in which:

Fig. 7 is a view in side elevation of a modified form of classifying chamber in which refuse collectors provided with gates are used for disposing of fine refuse;

Fig. 9 is a vertical sectional view taken on the line IX—IX of Fig. 4 showing a vertical section of the classification compartment.

Figure 1:
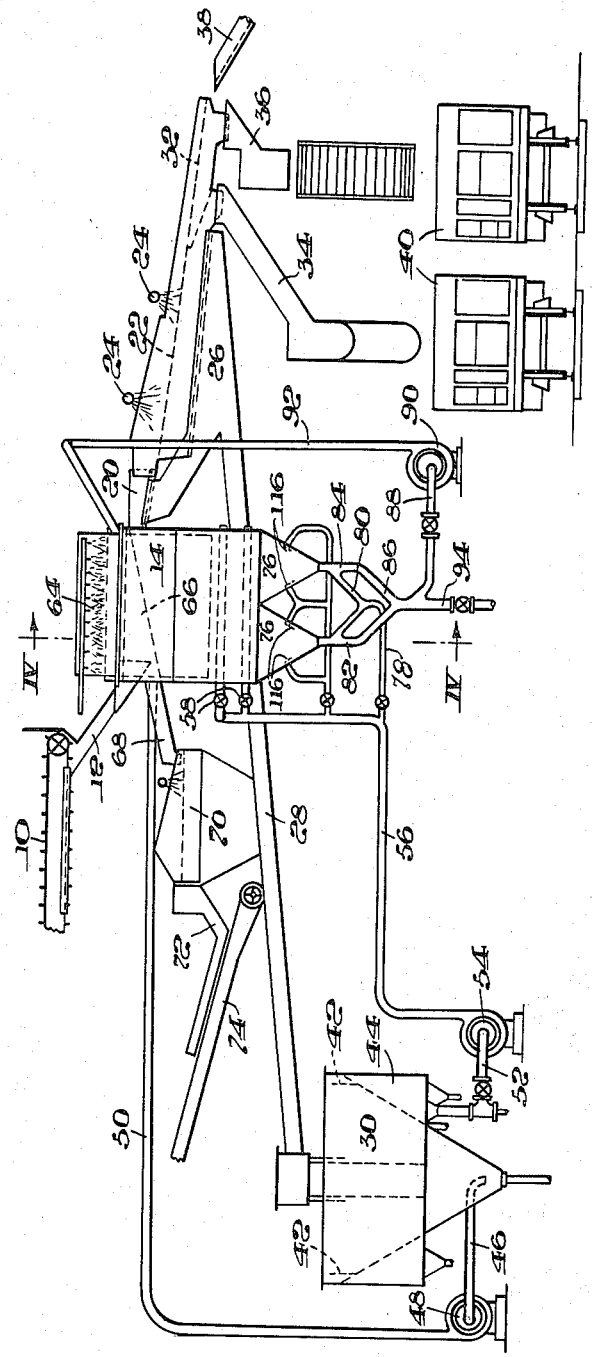
Fig. 1 is a view in side elevation of an apparatus for washing and classifying coal, which embodies the preferred form of the invention.

The assembly of apparatus embodying the preferred form of the invention which is to be used for washing and classifying coal is shown more particularly in Fig. 1. In this apparatus, coal in a granular form is introduced by a conveyor 10 to a chute 12 which feeds coal into the upper portion of a classifying chamber 14. The classifying chamber has a classifying compartment 16 (Figs. 2 and 3) which receives coal from the chute 12, and the coal which is floated in the compartment 16 advances through the compartment and overflows a weir 18. The coal is floated on a mass fluid composed of sand and water and a portion of this sand and water moves with the coal across the weir into a desanding screen 20. From the screen 20 the coal passes on to a washing screen 22 where it is carefully washed by water from sprays 24 to remove the sand from the coal. The sand and water pass from the screen 20 and screen 22 into a hopper 26, and flow from the hopper 26 through a chute 28 to a sand sump 30. The separated coal then passes from the screen 22 onto a sizing screen 32 where it is graded for sizes, and then passes out through chutes 34, 36 and 38 to receivers such as cars 40. The sand and water reaching the sand sump 30 settles, the sand going to the bottom of the sump, and the water substantially sand free overflows weirs 42 to be collected in a chamber 44. The sand and some of the water reaching the bottom of the sand sump is withdrawn through a pipe 46 and forced by a pump 48 through a line 50 into the upper portion of the classifying compartment 16 immediately below the coal feed chute 12, Fig. 9. The water from the compartment 44 is removed through a pipe 52 and forced by pump 54 through a line 56 and pipes 58 into the bottom of the separating chamber, and flows directly up into the bottom of the separating compartment 16 (see Figs. 3 and 4). Pipes 58 have openings distributed across the entire bottom thereof through which water enters into the bottom of the classifying chamber and rises up through the classifying chamber. Each pipe 58 is provided with a valve by which the flow may be accurately controlled in providing the desired density in the compartment 16 for floating the material to pass over the weir 18.

The construction and arrangement of the classifying compartment 16 is an important feature of the present invention. The particle size of the sand used in making the media is critical in the classification of most grades of bituminous and anthracite coal. The specific gravity of the sand-water float media is best controlled if the sand particles are finer than 40 mesh and coarser than 80 mesh. Further, the float separation will not be efficient unless a deep body of media is maintained in the compartment 16 having a uniform specific gravity throughout. Therefore, the compartment 16 has a uniform cross-section throughout its height being bounded by vertical parallel side walls 98 and by vertical end walls 59, Figs. 4 and 9.

The water introduced by the pipes 58 is accurately controlled as to volume for developing the desired specific gravity of the media in the compartment 16. To this end the pipes 58 deliver water over the entire area below the compartment 16 and the water is controlled to rise at a uniform rate throughout the area of the compartment. The upward velocity of water is preferably controlled by baffles 60 which extend across the classifying chamber adjacent the water inlet pipes 58. The baffles reduce the cross section area of the classifying chamber adjacent the distributing pipes 58 and give the water an increased velocity and proper distribution for passing through a conveyor screen 61 which moves across the bottom of the compartment 16. The control provides a uniform upward flow rate of velocity of water throughout the area of the compartment 16 above the screen 61. The water holds the sand in suspension and when the upflowing media meets the incoming coal, the coal and media flow across the top of the compartment and across the weir 18. The introduction of sand and water through the line 50 creates a stream flow to carry the clean coal and media across the weir so that no stirrers are needed to get the float coal out of the classifying compartment. Sand is only introduced into the compartment 16 through the pipe 50 and most of the sand goes out of the compartment with the clean coal.

Figure 5:
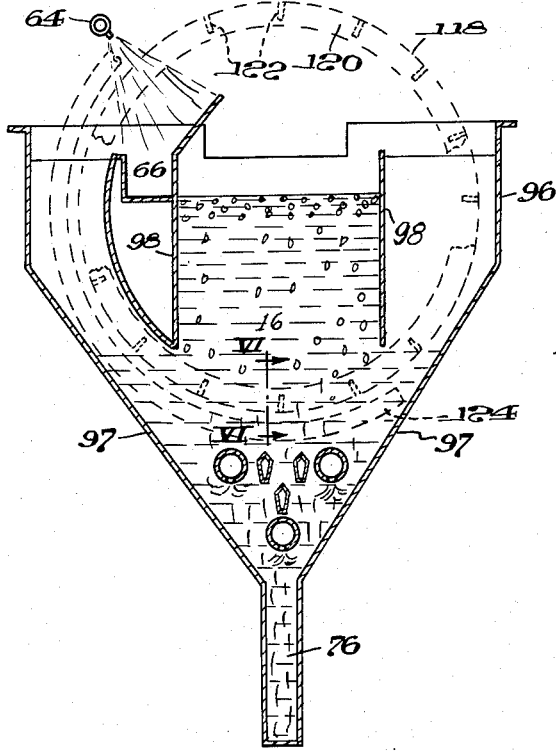
Fig. 5 is a vertical sectional view of a modified form of a classifying chamber in which a series of stationary spaced bars surround a portion of the refuse basket, and are used to replace the usual screen that is used on the basket.

The coal enters the compartment 16 with the water and sand without appreciably affecting the specific gravity of the media and slowly moves across the compartment to the outlet weir 18. During the travel of the coal across the compartment, the heavy bone, ash and refuse sink in the media and the clean coal passes over the weir. The coarse material is caught upon a screen 61 on the outside of an annular basket elevator 62. The screen moves slowly across the bottom of the classifying compartment to catch the coarse material, and this coarse material is carried upwardly by the elevator outside of the compartment 16 to a point where a spray of water from nozzles 64 forces the coarse material out of the conveyor into a chute 66 (Fig. 5). The screen carries away from the compartment 16 any refuse that will not pass a screen 61 having 2 to 10 mesh openings depending on the type of coal washed so that the refuse and sand which passes through the screen 61 is quite fine. Further, the movement of the elevator across the bottom of the compartment 16 does not interfere with the flow of water up through the compartment or disturb the floatation media in the compartment. From the chute 66 the coarse refuse, together with water, flows through a trough 68 to a refuse dewatering screen 70. The refuse passes across the screen 70 to a chute 72 which deposits the refuse on a conveyor 74 by which the refuse is carried to a receiver or dump.

The fine refuse and some sand readily settle into collectors 76. The density of the fluid mass in collectors 76 is preferably reduced by the introduction of water therein, so that the refuse which reaches the collectors will readily pass therethrough to be removed from the separating chamber. The water to be introduced into the collector 76 is taken from the pipe 56. One portion passes through a line 78 and then flows through a Y 80 into offtake pipes 82 and 84 connected with the bottoms of the collectors 76. The pipes 82 and 84 are connected with a Y 86 which in turn is connected with a pipe 88 leading to a pump 90 by which water and refuse are pumped through a line 92 back to the chute 66. The water and fine refuse from the pipe 92 join the coarse refuse and water introduced from the elevator 62 into the chute 66, and both types of refuse flow into the trough 68 and across the screen 70. The sand and water pass through the screen 70 and enter into the chute 28 to flow to the sand sump 30. A valved outlet pipe 94 is connected to the bottom of the Y 86 by which refuse and water may be removed from the bottom of the separating chamber for the purpose of cleaning it. Additional water may be introduced directly into collectors 76 through inlet connections 116.

Figure 2:
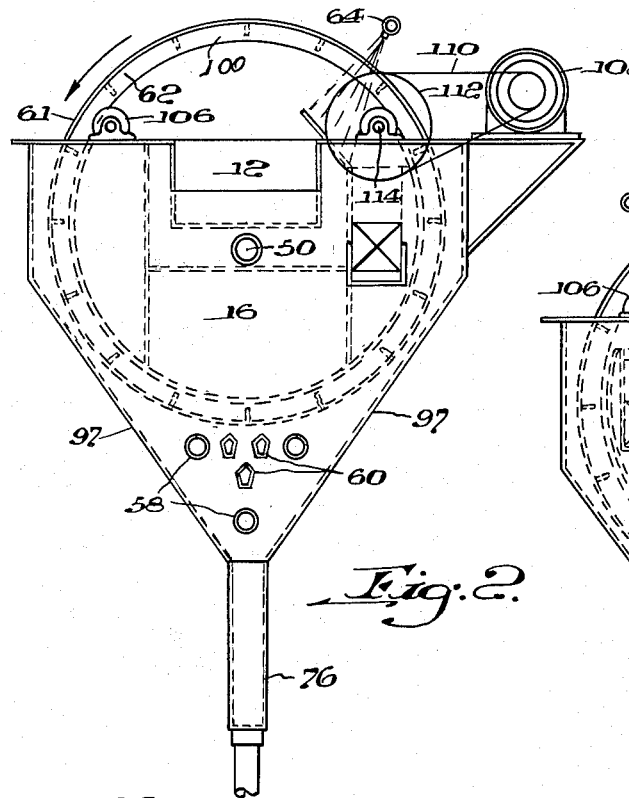
Fig. 2 is a view in end elevation of the classifying chamber of the apparatus shown in Fig. 1, viewing from the left side of Fig. 1.
Figure 3:
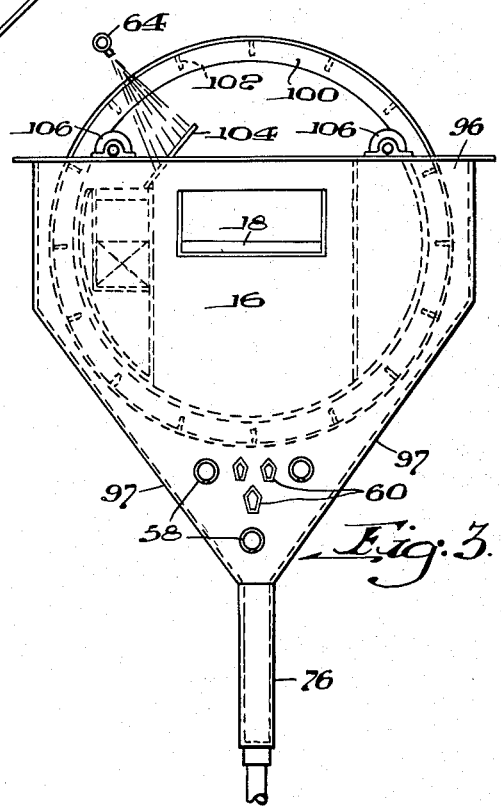
Fig. 3 is an end elevation of the classifying chamber viewing from the right side of Fig. 1.
Figure 4:
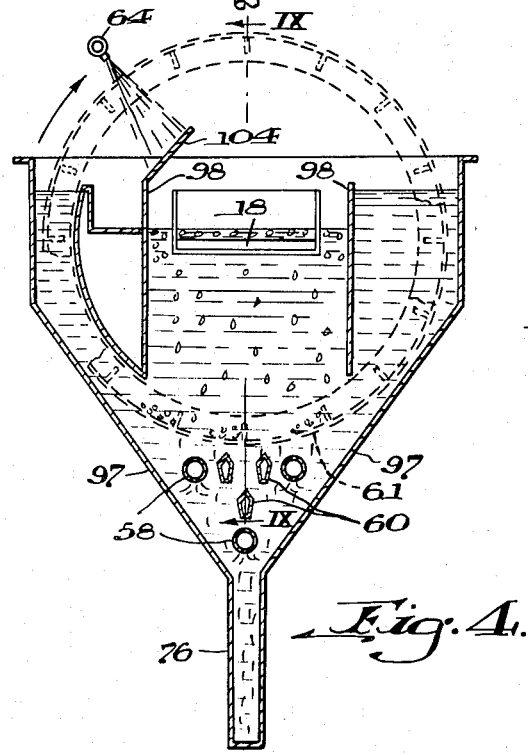
Fig. 4 is a vertical sectional view of the classifying chamber taken on the line IV—IV of Fig. 1.

The classifying chamber with its classifying compartment is shown more particularly in Figs. 2, 3 and 4. The chamber consists of an open top tank 96 having a sloping bottom 97 so that the fluid mass therein tends to drain to the central bottom portion of the tank. The top of the tank is open and the basket elevator 62 is mounted to rotate within the tank so that the bottom of the basket closely approaches the bottom of the tank.

The classifying compartment is formed within the classifying chamber and is surrounded by the elevator basket 62. The sides of the classifying compartment are partitions 98 which extend across the inside of the basket elevator 62 with the bottom of the partitions terminating in close proximity to the path of movement of the inside of the elevator basket. The ends 59 of the compartment 16 are parallel to the side walls 96 of the classifying chamber and form a quiescent zone which contains water which is practically free of sand. The space between the partitions 98 and the walls 96 is also a quiescent zone which contains water that is practically free of sand. Water extends around behind the partitions 98 and 59 and stands at a higher level in these zones than the level of the water in compartment 16 because there is no upward current of water in the compartments to keep the sand therein in suspension so that the specific gravity of the fluid outside the compartment is substantially one, while the sand-water mixture in the compartment 16 has a much higher specific gravity. Both solutions are in balance in the bottom of the separating chamber. The construction of the sloping bottoms 97 of the classifying chamber is important in that it is important to prevent sand from settling on the bottom to interfere with the operation of the basket 62 and the maintenance of the desired specific gravity of the sand-water media. In accordance with the type of sand used, the bottom should have a slope between 50° and 70° to the horizontal (preferably 65°).

It is necessary to continuously feed sand back into the compartment 16 through the pipe 50 to replace the sand that overflows the weir 18 with clean coal. Water must be fed to the separator through the pipes 58 to maintain a uniform upward current of water. This current of water keeps the sand dispersed in the compartment 16 to establish a desired specific gravity. The higher the velocity of the upward current of water, the more the sand is separated, and the lower the specific gravity of the sand-water mass fluid. Conversely, the lower the upper current velocity of water, the greater will be the specific gravity of the mass fluid.

In the operation of the present classifying apparatus it has been found that if the sand is disintegrated to a fineness smaller than 80 mesh such fine sand will pass over weir 42 of the sand sump with the slurry and be removed from the water compartment 44 of the sand sump. Thus the operation automatically provides a sand of the desired density because only the coarser sand is supplied to classifying compartment 16 from the sand sump.

The elevator basket 62 is composed of rails 100 at each end of the basket between which flights 102 are connected, and to which the screen 61 is attached. The flights 102 act to carry the coarse refuse up to a baffle 104 (Figs. 3 and 4), against which the refuse is discharged by water from the nozzles 64. The baffle 104 directs the heavy refuse into the chute 66. The end rails are mounted at each end of the basket upon rollers 106, the right-hand rollers viewing Figs. 2 and 3 being positively driven by means of a motor 108, belt 110, and drive pulley 112, fixed to shaft 114 on which rollers 106 are fixed. The direction of rotation of the basket is shown more particularly in Figs. 2 and 4.

The collectors 76 have a rectangular conical shape which acts to contract the cross sectional area of the bottom of the compartment 16. Only the fine refuse and sand enters the collectors 76 and water passes up through the collectors from pipes 80, and from nozzles 116 connected with pipe 56, to keep sand in suspension in the collectors. A relatively high upward velocity of water is maintained in the collectors to keep the specific gravity of the liquid mass low, so that the fine refuse will readily settle through the collectors to the outlet pipes 82 and 84 and then flow through the pipes 88 and pump 90 to be returned through the pipe 92 to the chute 66.

Figure 6:
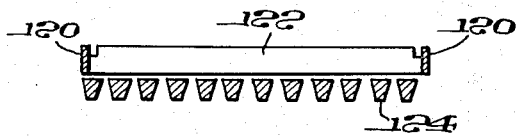
Fig. 6 is a sectional view of the basket screen taken on the line VI—VI of Fig. 5.

In Figs. 5 and 6 is shown a modified form of elevator basket to dispose of the coarse refuse. This elevator 118 omits the usual screen and is made up merely of end plates 120 and conveyor flights 122. A screen composed of a series of bars 124 is mounted in the base of the chamber 96 to surround the elevator basket, and extends past the partition 98 at the right side of the compartment 16 (viewing Fig. 5) up to close proximity with the spray nozzle 64. The elevator flights drag the coarse refuse across the screen bars and carry it up until the water streams from the nozzles 64 force the coarse refuse into the chute 66. The fine refuse has an opportunity to pass through the screen made up of the series of bars 124.

It will be noted with reference to Figs. 1, 2, 3, 4 and 5, that the elevator basket extends across the bottom of the classifying compartment 16 so that the coarse refuse settling through the compartment will be caught by the basket and not permitted to pass down into the collecting chambers 76. It has been found that if coarse material enters into the compartments and outlets 82 and 84, this coarse material will clog the outlets, pipes and pump to interfere with the ready disposal of the fine refuse.

In Fig. 7 is shown an alternative form of apparatus for disposing of the fine refuse which settles from the separating chamber. In the apparatus shown in Fig. 7, the fine refuse passes from outlet pipes 94 into refuse chambers 156. The control of flow of refuse into the chambers 156 is obtained by means of slide gates 158. After the chambers 156 have been filled with refuse and water, the slide gates 158 are closed, and slide gates 160 at the bottom of the chambers 156 are opened to admit water and refuse from the refuse chambers into a pipe 162. Pipe 162 is connected with a pump 164 which draws a mixture of sand and water through a pipe 166 mounted in a sand sump 168. The movement of sand and water by means of the pump 164 will draw the refuse and water along with the sand and water and force it through a pipe 170 into an elevated refuse screen 172. The refuse will pass off of the screen through a chute 174 down to a refuse disposal chute 176, which may deposit refuse on a conveyor such as conveyor 74, Fig. 1. The sand and water passing through the screen 172 flow through pipe 178 to the classifying chamber 14. The sump 168 corresponds to the sand sump 30 as illustrated in Fig. 1, and water from the sand sump would be circulated to the classifying chamber by means of a pump such as 54 and pipe 56.

Figure 8:
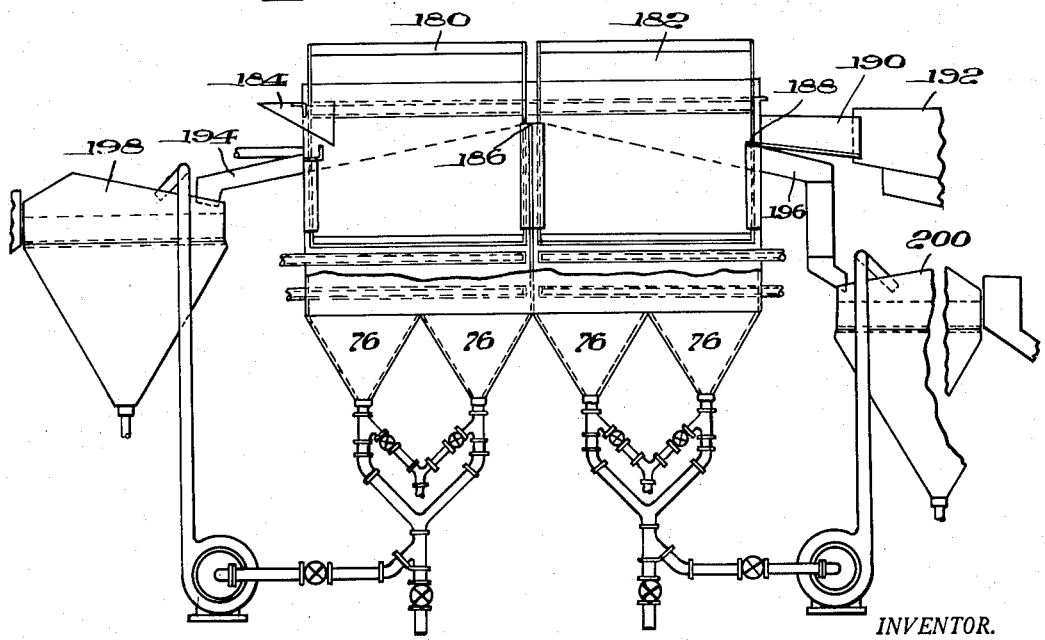
Fig. 8 is a view in side elevation of an apparatus in which two classifying chambers are used in tandem for maintaining two different densities of fluid mass to make a separation of at least three products.

In Fig. 8 is illustrated the use of a pair of classifying chambers 180 and 182 for separating three components of a heavy solid material to be classified. With this apparatus, coal is introduced through a chute 184, and will pass through the classifying compartment to a weir 186 at the end of the compartment. The coal and water and sand which overflow from the chamber 180 will enter a classifying compartment in the chamber 182. In the chamber 182 a further mixture of sand and water is maintained, having a lower density than the density of the mass fluid in chamber 180. A weir 188 is mounted at the outlet of the compartment in the chamber 182 over which the twice-classified coal will flow into a separating trough 190 and washing trough 192. Coal passing through the trough may then be graded and sized as explained above. The coarse refuse separated in each of the chambers 180 and 182 is separately collected by means of elevator baskets to be introduced through chutes 194 and 196 to go to screens 198 and 200. The coarse refuse collected on the screen 200 may be further treated to recover its coal content. The construction and operation of each of the separators is the same as that illustrated with reference to Figs. 1, 2, 3 and 4, the arrangement being such that the material classified in chamber 180 will be further classified on a different density mass fluid for the purpose of securing a highly classified material.

With the method and apparatus defined above, I have found that for the separation of clean coal the classification compartment 16 needs to be only six feet long to get a sufficient separation of the refuse from the clean coal. I find that the separating capacity of the apparatus is about fifty tons of coal per hour per foot in width of the compartment 16. Thus with a compartment six feet square, 300 tons of coal per hour may be washed and separated. This gives a capacity of 8⅓ tons per square foot of cross section of the compartment 16. This apparatus thus has about 3.4 times the treating capacity of the usual "Chance" cone.

The specific examples outlined in the above description have been directed to the washing of coal. It will be understood, however, that the same apparatus will be very effective in classifying solid mixtures of material which are to be separated. The sand and water introduced into the apparatus may be circulated to give practically any desired density for floating a desired material.

It will be noted from the above description that there are no positively moved parts in the classifying compartment or outlet for refuse except the apparatus of Fig. 7 which will tend to erode and wear out the equipment. It will be understood that all apparatus which has to circulate water and sand will have some wear, but the apparatus described above will have comparatively no wear, as distinguished from the type of apparatus in which sand and water are agitated by agitators, elevators and slide gates for the purposes of maintaining the desired circulation.

If the solid material or coal which is being classified is carefully screened before it is introduced into the classification compartment, the amount of fine residue which might possibly pass through the screen at the bottom of the elevator will be very small. In such a case, it may not be necessary to recirculate water and sand from the bottom of the separating chamber through the pump 90 and pipe 92. The small amount of residue that would collect at the bottom of the tube 94 may be intermittently drawn off, or a collecting chamber such as 156, Fig. 7, may be connected to the draw off tube 94 to collect residue over a period of time, and then this residue may be discharged to be disposed of. In such an operation, there would be practically no fine residue to be handled by the process.

In the appended claims, the mass fluid is referred to as a mixture of sand and water. It is to be understood that the mass fluid may be made of water with sand or any water insoluble material having a higher specific gravity than the specific gravity of the material being classified.

This application is a continuation-in-part of my pending application Serial No. 214,807, filed March 9, 1951, for Heavy Solid Mixture Classification, which is now abandoned.

The preferred form of the invention having thus been described, what is claimed as new is:

1. A method of classifying coal containing bone, slate, and heavy residue comprising, introducing the mixture of coal and residue into a classifying compartment containing a relatively deep confined body of sand generally coarser than 80 mesh suspended in an active body of water flowing upwardly therein to maintain a density between 1.30 and 1.70 throughout the compartment, continuously adding sand to the top of the compartment and continuously introducing water into the bottom of the compartment with a velocity to maintain a media of desired density in the compartment, arresting and holding the downward sink of heavy coarse residue in the media at the bottom of the compartment while permitting fine residue to pass downwardly and water to pass upwardly through the coarser residue, maintaining the float media in hydraulic equilibrium with a body of comparatively quiescent water surrounding the compartment, continuously conveying the coarse residue away from the bottom of the compartment and through the surrounding body of water, passing the desired float coal transversely to the top of the body of float media together with a stream of float media, skimming off the float coal with its surrounding float media, and washing sand away from the separated float coal.

2. An apparatus for making density classification of a mixture of solids of different densities comprising a separating chamber having a rectangular classification compartment therein, said compartment having closed sides and being open at the bottom, means for introducing a mixture of sand-water and solids to be classified into one end of the compartment near the top thereof, a weir outlet for the compartment opposite the solids inlet for the removal of sand media and the desired solid, means for introducing water into the entire area of the open bottom of the compartment with a controlled volume to maintain a float sand-water body in the compartment of a density to float the solid of desired density, a screen positioned above the water inlets arranged to extend across the entire cross sectional area of the compartment, said screen having openings sized to hold coarse heavy sink solids while permitting fine heavy residue and water to pass therethrough, an outlet at the bottom of the chamber arranged for removal of the fine sink residue, a chute in the classifying chamber above the compartment to carry residue away from the chamber, an elevator movable across the entire open bottom of the compartment to carry the coarse sink solids held by the screen to the chute, and means to separate sand and water from the floated solid of desired density.

3. An apparatus for making density classification of a mixture of solids comprising a separating chamber having a classification compartment therein, said compartment having an open bottom and closed sides, means to introduce sand into the top of the compartment at one end thereof, means to pass water upwardly throughout the area of the compartment with a proper volume to create a sand-water float media of definite density in the compartment, an overflow at the top of the compartment at the end opposite the said inlet end for discharge of float media with clean solids and sand-water, a chute to introduce mixed solids into the top of the compartment adjacent the sand inlet, a residue discharge chute mounted above the compartment, a screen extending across the bottom of the compartment having openings therein to permit fine residue and water to pass therethrough, an annulus elevator mounted to move around the compartment arranged to carry coarse heavy residue which is held by the screen to the discharge chute, the walls of said compartment being separated from the walls of the separating chamber with spaces between said walls through which the elevator moves, said spaces being open for hydrostatic communication with the fluid in the separating compartment and having no upper fluid outlet and a water and residue outlet at the bottom of the chamber.

4. The classification apparatus defined in claim 2 in which the sides of the separating compartment are vertical and the cross sectional area of the compartment is uniform from the bottom to the top thereof.

5. The classification apparatus defined in claim 2 in which the walls of the chamber adjacent and below the mid portion of the separating compartment have a slope of 55° to 70° to the horizontal to cause sand and residue to settle into the bottom of the chamber.

6. The classification apparatus defined in claim 2 in which water is introduced into the bottom of the chamber through pipes having outlet openings arranged to introduce water throughout the area of the bottom of the chamber, said pipes being positioned below the screen to distribute the water to pass through the screen and throughout the area of the separating compartment.

7. The classification apparatus defined in claim 6 in which a plurality of baffles are positioned in the path of flow of water introduced by the pipes to control the upward velocity and the distribution of water passing up through the screen.

8. The classification apparatus defined in claim 2 in which the residue elevator carries the coarse residue through a quiescent body of water at the side of the compartment in carrying the residue to the discharge chute.

9. The classifying apparatus defined in claim 2 in which the screen is attached to and movable with the elevator.

10. The classifying apparatus defined in claim 2 in which the screen is mounted in fixed position in the chamber to be closely adjacent the path of movement of the elevator to maintain coarse residue in the elevator until it is discharged.

11. The classifying apparatus defined in claim 2 in which water sprays are mounted at the side of the elevator to assist removal of residue out of the elevator into the discharge chute.

12. The classifying apparatus defined in claim 2 in which collectors are mounted at the bottom of the chamber below the screen with means at the bottom thereof to introduce water upwardly through the collector to reduce the density of fluid mass therein and facilitate the sinking of the residue throughout.

13. The classifying apparatus defined in claim 2 in which the fine residue from the discharge outlet is conducted through a line to a pump and forced by means of the pump through a line to the residue chute.

14. An apparatus for making density classification of a mixture of solids comprising a pair of separating chambers having classifying compartments therein, each of said classifying compartments having a separating media of desired density therein which connects with and is in hydrostatic equilibrium with a body of water surrounding the compartment, an overflow for sand, water and float solids from the compartment of the first chamber into the compartment of the second chamber, an overflow for conducting water and float solids out of the compartment of the second chamber, said overflow from the second chamber being vertically lower than the overflow of the first compartment, residue chutes extending into each chamber, a screen at the bottom of each compartment to separate course residue, elevators mounted to move across the bottom of each compartment to remove coarse residue therefrom, means to operate the elevators, means to wash residue out of the elevators into the chutes, a separate screening means arranged to receive residue from each chute, means to introduce sand and water into the upper portion of the first compartment, and means to introduce water upwardly into each compartment to control the density of fluid mass in each compartment.

15. The classification apparatus defined in claim 2 in which fine residue from the discharge outlet is collected in a residue chamber having a slide gate at the inlet and outlet thereof for intermittent filling and emptying thereof without disrupting the flow of mass fluid in the classifying chamber.

16. The classification apparatus defined in claim 15 in which sand and water are drawn through a line from a storage tank and forced by a pump through a line to a screen arranged to reject residue while collecting sand and water, a collecting line between the sand and water line and the fine residue chamber to supply fine residue to the sand and water line to convey fine residue to the screen, and a line to conduct sand and water from the screen to the compartment.

17. An apparatus for making density classification of a mixture of solids comprising a separating chamber having a classification compartment therein, said compartment having an open bottom and closed sides, means for introducing sand into the top of said compartment, means for introducing water into the open bottom of said compartment and thence upwardly through the compartment in proper volume to create a sand-water float medium of definite density in the compartment, means for introducing solids to be classified into an inlet end of said compartment near the top thereof, an overflow at the top of said compartment at the end opposite said inlet end for discharge of float medium with clean solids, a screen extending across the bottom of said compartment having openings therein to permit fine residue and water to pass therethrough, an annulus elevator movably arranged around the compartment to carry away coarse heavy residue which is caught by the screen, the side walls of said compartment being separated from the side walls of said separating chamber to provide spaces through which the elevator moves, said spaces being in communication with the open bottom of said compartment to permit fluid to enter said spaces to a level determined by the relative densities of said float medium and the entering fluid, said spaces being laterally displaced from the path of upwardly flowing water, whereby quiescent zones of substantially sand free fluid are maintained in said spaces, means adjacent the top of said spaces for removing residue from said annulus elevator and for discharging same from said separating chamber, and a water and residue outlet at the bottom of the chamber.

18. The classification apparatus defined in claim 14 in which the screen at the bottom of each compartment has perforations of a size to permit fine residue to pass through the screen and a pump and conduit communicating with the outlet of each compartment delivers fine residue to the residue screen of the corresponding compartment to separately collect the residue from each compartment.

References Cited in the file of this patent

UNITED STATES PATENTS

| | | |
|---|---|---|
| Re. 16,674 | Chance | July 12, 1927 |
| 1,988,371 | Chance | Jan. 15, 1935 |
| 2,237,442 | MacFarlane | Apr. 8, 1941 |
| 2,474,774 | Bean | June 28, 1949 |
| 2,479,141 | Smith | Aug. 16, 1949 |
| 2,482,747 | Davis et al. | Sept. 27, 1949 |
| 2,516,962 | Davis | Aug. 1, 1950 |
| 2,521,152 | Davis | Sept. 5, 1950 |

OTHER REFERENCES

Rock Products, vol. 53, No. 11, November 1950, page 53. (Copy in Division 55.)